United States Patent
Brzezinski et al.

(10) Patent No.: US 9,746,025 B2
(45) Date of Patent: Aug. 29, 2017

(54) AXIAL ROLLER BEARING ASSEMBLY HAVING A SPRING PLATE

(71) Applicant: Schaeffler Technologies AG & Co. KG, Herzogenaurach (DE)

(72) Inventors: Clayton Brzezinski, Charlotte, NC (US); James Kevin Brown, Rock Hill, SC (US); Trevor Yorick, Gastonia, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/005,405

(22) Filed: Jan. 25, 2016

(65) Prior Publication Data

US 2017/0211620 A1 Jul. 27, 2017

(51) Int. Cl.
*F16C 19/30* (2006.01)
*F16C 35/04* (2006.01)

(52) U.S. Cl.
CPC .......... *F16C 19/305* (2013.01); *F16C 35/042* (2013.01)

(58) Field of Classification Search
CPC ............................... F16C 19/30; F16C 19/305
See application file for complete search history.

(56) References Cited

U.S. PATENT DOCUMENTS

| | | | | |
|---|---|---|---|---|
| 2,325,193 A * | 7/1943 | Nutt | | F16F 1/32 |
| | | | | 192/70.27 |
| 3,341,263 A * | 9/1967 | Pitner | | F16C 19/381 |
| | | | | 384/455 |
| 3,934,956 A * | 1/1976 | Pitner | | F16C 19/30 |
| | | | | 384/455 |
| 4,733,979 A * | 3/1988 | Tsuruki | | F16C 19/30 |
| | | | | 384/620 |
| 5,918,987 A | 7/1999 | Sundquist et al. | | |
| 5,967,674 A * | 10/1999 | Reubelt | | F16C 19/30 |
| | | | | 384/620 |
| 5,975,763 A | 11/1999 | Shattuck et al. | | |
| 6,830,380 B2 * | 12/2004 | Kennedy, Jr. | | F16C 25/083 |
| | | | | 384/462 |
| 7,318,676 B2 * | 1/2008 | Fugel | | F16C 19/30 |
| | | | | 384/620 |
| 2011/0182542 A1 * | 7/2011 | Brown | | F16C 19/30 |
| | | | | 384/620 |
| 2013/0136387 A1 * | 5/2013 | Fugel | | F16C 19/30 |
| | | | | 384/620 |

FOREIGN PATENT DOCUMENTS

DE 10212221066 A1 5/2014

* cited by examiner

*Primary Examiner* — Thomas R. Hannon
(74) *Attorney, Agent, or Firm* — Volpe and Koenig, P.C.

(57) ABSTRACT

An axial roller bearing assembly is provided. The axial roller bearing assembly includes a first axial washer including a contact surface, a bearing element engaging the first axial washer, and a spring plate connected to the first axial washer and including a first surface and a second surface. The second surface is in contact with at least a portion of the contact surface. The spring plate is configured to deflect under a load applied to the first surface such that an increasingly larger portion of the second surface abuts the contact surface.

10 Claims, 3 Drawing Sheets

AXIAL ROLLER BEARING ASSEMBLY HAVING A SPRING PLATE

FIELD OF INVENTION

The present invention relates to an axial roller bearing assembly, and, more particularly, to an axial roller bearing assembly having a spring plate.

BACKGROUND

Axial roller bearings are provided in different applications to carry axial loads. In some applications, axial roller bearings are provided with races having a convex rolling element contact surface in cross section, such as shown in U.S. Pat. No. 5,975,763. This design allows the races to deform with increasing load so that the contact between the needle rollers and the races is proportional to the applied load, allowing the load bearing capacity of the bearing to proportionately increase under an applied load. This arrangement is indicated as increasing bearing life and is said to reduce noise and optimize efficiency under variable load conditions. However, it has been found that this arrangement can create high contact pressures due to the reduced contact area, which results in poor formation of the lubrication film.

In certain applications, such as torque converter axial bearings, the load is not applied at a constant radial position due to expansion of the torque converter. These conditions result in the axial load contact position shifting radially outwardly on the bearing ring, thereby placing a higher axial load on radially outer regions of the rollers which can, in effect, pinch the rollers at their outer ends. This may lead to premature spalling failure of the axial roller bearing. The use of an additional flat washer as a thrust surface, such as in U.S. Pat. No. 5,918,987, does not address these problematic effects of edge loading.

It would therefore be desirable to provide an axial roller bearing which addresses the problem of edge loading and other drawbacks of the prior art.

SUMMARY

In one aspect, an axial roller bearing assembly includes a first axial washer including a contact surface, a bearing element engaging the first axial washer, and a spring plate connected to the first axial washer and including a first surface and a second surface. The second surface is in contact with at least a portion of the contact surface. The spring plate is configured to deflect under a load applied to the first surface such that an increasingly larger portion of the second surface abuts the contact surface.

In another aspect an axial roller bearing assembly includes a first axial washer including a circumferentially extending body having a first axial flange, a second axial flange, and a radial flange forming an S shape in cross-section, the radial flange including a contact surface. The axial roller bearing assembly further includes a second axial washer including a second circumferentially extending body, and a bearing element positioned between and engaging the first axial washer and the second axial washer, the bearing element including a cage and a plurality of rollers. The axial roller bearing assembly also includes a spring plate connected to the first axial washer via the first axial flange, the spring plate being curved in a direction axially away from the radial flange as the spring plate extends from a radially inner end to a radially outer end.

BRIEF DESCRIPTION OF THE DRAWING(S)

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENT(S)

Figure 1:
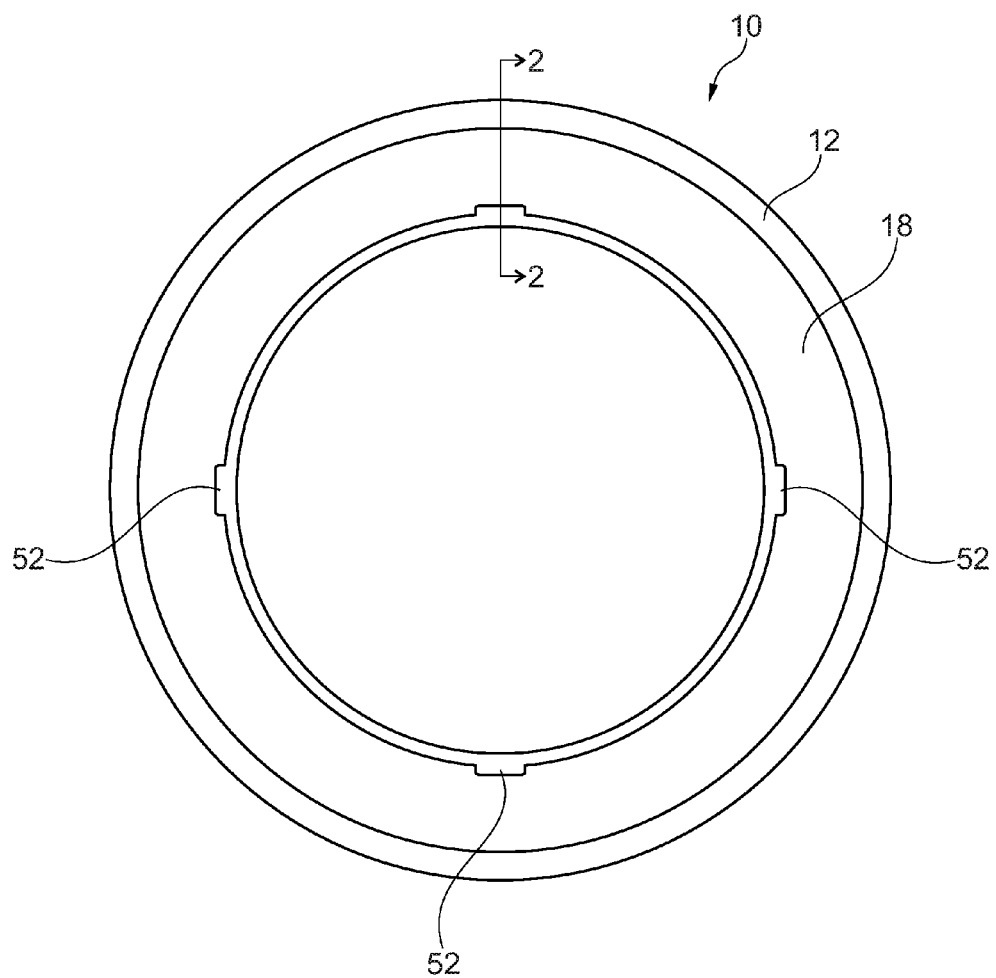
FIG. 1 is a plan view of an axial roller bearing.
Figure 2:
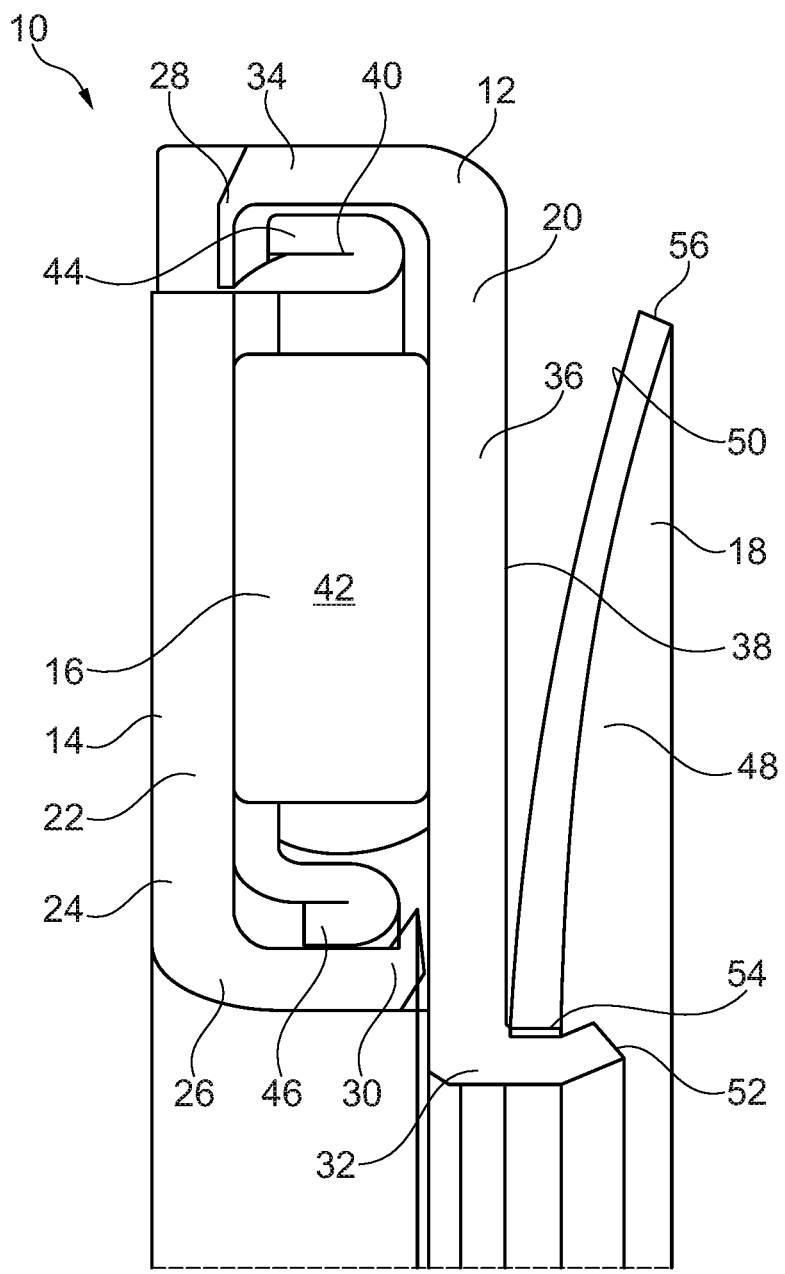
FIG. 2 is a cross-sectional view of the axial roller bearing taken along line 2-2 in FIG. 1, including a spring plate which is not under loading conditions.
Figure 3:
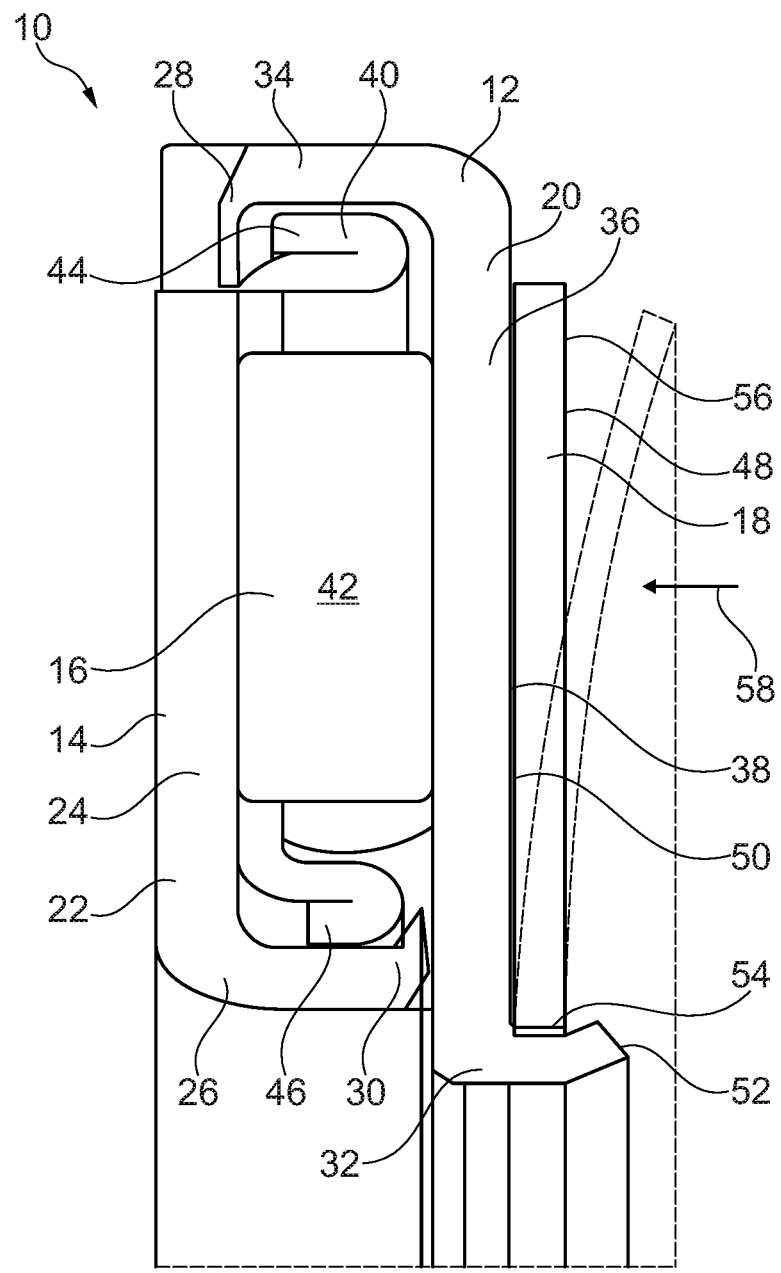
FIG. 3 is a cross sectional view of the axial roller bearing of FIGS. 1 and 2, including the spring plate which is deflected under loading conditions.

FIGS. 1-3 depict an axial roller bearing assembly 10. The axial roller bearing assembly 10 may be used in conjunction with a rotating device, such as a torque converter, to permit axial rotation and support an axial load. In an exemplary embodiment, the axial roller bearing assembly 10 ("bearing assembly 10") includes a first axial washer 12, a second axial washer 14, a bearing element 16, and a spring plate 18.

The first axial washer 12 includes a circumferentially extending body 20 having a first axial flange 32, a second axial flange 34, and a radial flange 36 connecting the first axial flange 32 and the second axial flange 34. The first axial flange 32 extends from a radially inner side of the radial flange 36 in a first axial direction. The second axial flange 34 extends from a radially outer side of the radial flange 36 in a second axial direction, opposite to the first axial direction. The first axial washer 12 thereby forms an S shape in cross-section, as shown. The radial flange 36 forms a contact surface 38 for engaging the spring plate 18, as will be described in more detail below.

The second axial washer 14 includes a second circumferentially extending body 22 having a radial flange 24 and a third axial flange 26 extending from the inner side in a same direction as the first axial flange 32, forming an L shape in cross-section.

The bearing element 16 is positioned between and engages the first axial washer 12 and the second axial washer 14. For example, the bearing element 16 is positioned adjacent to races formed by facing surfaces of the radial flanges 36, 24 of the first and second axial washers 12, 14, respectively. The first axial flange 34 extends over a radially outer end of the bearing element 16. The third axial flange 26 extends over the radially inner end of the bearing element 16.

The bearing element 16 is preferably an axial needle roller arrangement, although other types of bearing elements are possible. In an exemplary embodiment, the bearing element 16 includes a plurality of rollers 42 which are spaced apart circumferentially from one another by a cage 40. The cage 40 and rollers 42 may be formed in a cage and roller assembly that is preassembled and includes the cage 40 preferably stamped from sheet metal, with pockets. The rollers 42 are located in at least some of the pockets and roll against the bearing races provided on the first and second axial washers 12, 14. A lubricant may be positioned in between the bearing races and the rollers 42. An axial force exerted on the contact surface 38 may help to maintain the rollers 42 in contact with the bearing races of the first and second axial washers 12, 14, which may help to ensure proper operation.

The cage 40 may include a radially outer flange 44 and a radially inner flange 46, as shown in FIG. 2. The radially outer flange 44 at least partially engages with the first axial washer 12, preferably by snapping past punched-in tabs 28 on the second axial flange 34, and the radially inner flange 46 at least partially engages with the second axial washer 14, preferably by snapping past punched-in tabs 30 on the third axial flange 26, in order to retain the bearing element 16 with the first axial washer 12 and the second axial washer 14.

The spring plate 18 includes a first surface 48 and a second surface 50. The spring plate 18 is connected to the first axial washer 12 such that at least a portion of the second surface 50 is in contact with the contact surface 38. The spring plate 18 is configured to deflect under a load applied to the first surface 48 and return to an initial shape (as shown in FIG. 2). In an exemplary embodiment, the spring plate 18 is a diaphragm spring.

In an exemplary embodiment, the spring plate 18 is connected to the first axial flange 32. For example, the inner diameter of the spring plate 18 is sized such that the spring plate 18 is supported by the first axial flange 32. The first axial washer 12 further includes a plurality of retention tabs 52 spaced around a circumference of the first axial flange 32. The retention tabs 52 extend radially outward beyond the inner diameter of the spring plate 18 such that the spring plate 18 is retained on the first axial flange 32. The retention tabs 52 and/or spring plate 18 may be flexible such that the spring plate 18 may be installed on the first axial flange 32. While retention tabs 52 are described herein, it should be understood that the spring plate 18 may be connected to the first axial washer 12 in other manners (e.g., fasteners, adhesive, etc.).

The first and second axial washers 12, 14 may be punched or stamped from a bearing grade sheet metal, and then are de-burred or subjected to other surface treatment prior to being hardened and tempered. The cage 40 may also be stamped from sheet metal but can also be formed from a polymeric material, if desired. The rollers 42 are preferably formed from hardened and tempered bearing grade steel. The spring plate 18 may be formed from a suitable material in a manner that imparts the biasing functionality described herein to the spring plate 18.

FIG. 2 illustrates spring plate 18 under a first loading condition in which no force or a low force is applied to the first surface 48. As shown, when the spring plate 18 is under no- or low-load, the spring plate 18 is curved in a direction axially away from the radial flange 36 as the spring plate 18 extends from a radially inner end 54 to a radially outer end 56. In this way, the radially inner end 54 is initially positioned closer to the contact surface 38 than the radially outer end 56.

The first surface 48 of the spring plate 18 is configured to contact a component adjacent to the bearing assembly 10, such as a torque converter (not shown). Initially, only the radially outer end 56 of the first surface 48 contacts the adjacent surface of the torque converter. The torque converter, however, may exert an axial force on the first surface 48 of the spring plate 18 in a direction 58. Under loading conditions such as this, the spring plate 18 is configured to deflect such that the radially outer end 56 moves closer to the contact surface 38.

FIG. 3 depicts the spring plate 18 under loading conditions. As shown, the spring plate 18 deflects into a substantially planar shape when under a second loading condition, greater than the first loading condition (e.g., edge loading). As the spring plate 18 flattens, an increasingly larger portion of the second surface 50 of the spring plate 18 abuts the contact surface 38 of the first axial washer 12 until an entire area of the second surface 50 abuts the contact surface 38. When the second loading condition is removed (which includes a reduction in the load), the spring plate returns or moves closer to the position of FIG. 2.

In some instances, such as when a torque converter expands under high-speed operation, a distributed load on the spring plate 18 will be uneven as it will be greatest near the radially outer side of the roller bearing assembly 10. Due to the configuration of the spring plate 18, the spring plate 18 is configured to redistribute the uneven load transferred to the contact surface 38 toward the radially inner portion of the bearing assembly 10. For example, due to the curved shape of the spring plate 18, the spring plate 18 will absorb a portion of the force that is exerted near the radially outer portion of the bearing assembly 10. This redistributes the force more evenly across the contact surface 38, thereby helping to prevent premature failure of the bearing assembly 10 by ensuring proper operation of bearing element 16 (e.g., maintaining consistent contact between rollers 42 and the bearing races of first and second axial washers 12, 14).

It should be understood that the illustrated roller bearing assembly 10 is exemplary and that features thereof may be applied to other roller bearing assemblies. The spring plate 18 may be applied to a roller bearing assembly that does not include the configuration of first and second axial washers 12, 14, and bearing element 16. In some instances, spring plate 18 may be applied to a roller bearing assembly that only includes first axial washer 12 that engages a bearing element, whether or not it is the bearing element 16 or another bearing element.

Having thus described various embodiments of the present bearing assembly 10 in detail, it is to be appreciated and will be apparent to those skilled in the art that many physical changes, only a few of which are exemplified in the detailed description above, could be made in the assembly without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. An axial roller bearing assembly, comprising:
   a first axial washer including a contact surface;
   a bearing element engaging the first axial washer; and
   a spring plate connected to the first axial washer and including a first surface and a second surface, the second surface being in contact with at least a portion of the contact surface,
   wherein the spring plate is configured to deflect under a load applied to the first surface such that an increasingly larger portion of the second surface abuts the contact surface.

2. The axial roller bearing assembly of claim 1, wherein the spring plate is curved under a first loading condition and is configured to deflect to a substantially planar shape under a second loading condition.

3. The axial roller bearing assembly of claim 2, wherein the spring plate is configured to return to a curved shape when the second loading condition is removed.

4. The axial roller bearing assembly of claim 3, wherein the spring plate is a diaphragm spring.

5. The axial roller bearing assembly of claim 1, wherein the first axial washer includes a first axial flange configured to support the spring plate.

6. The axial roller bearing assembly of claim 5, wherein the first axial washer further includes a plurality of retention tabs configured to retain the spring plate on the first axial flange.

7. The axial roller bearing assembly of claim 5, wherein the first axial washer includes a second axial flange configured to extend over at least a portion of the bearing element.

8. An axial roller bearing assembly, comprising:
a first axial washer including a circumferentially extending body with first axial flange, a second axial flange, and a radial flange forming an S shape, the radial flange including a contact surface;
a second axial washer;
a bearing element positioned between and engaging the first axial washer and the second axial washer, the bearing element including a cage and a plurality of rollers; and
a spring plate connected to the first axial washer via the first axial flange, the spring plate being curved in a direction axially away from the radial flange as the spring plate extends from a radially inner end to a radially outer end.

9. The axial roller bearing assembly of claim 8, wherein the spring plate is configured to deflect into a substantially planar shape.

10. The axial roller bearing assembly of claim 9, wherein the spring plate is configured to redistribute an uneven axial load on the contact surface toward a radially inner portion of the axial roller bearing assembly.

* * * * *